(12) United States Patent
Lee

(10) Patent No.: US 11,290,600 B2
(45) Date of Patent: Mar. 29, 2022

(54) DIAGNOSING STATUS OF IMAGE FORMING APPARATUS

(71) Applicant: HEWLETT-PACKARD DEVELOPMENT COMPANY, L.P., Spring, TX (US)

(72) Inventor: Ki Youn Lee, Pangyo (KR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/042,757

(22) PCT Filed: Oct. 29, 2018

(86) PCT No.: PCT/KR2018/012892
§ 371 (c)(1),
(2) Date: Sep. 28, 2020

(87) PCT Pub. No.: WO2019/235699
PCT Pub. Date: Dec. 12, 2019

(65) Prior Publication Data
US 2021/0029254 A1   Jan. 28, 2021

(30) Foreign Application Priority Data
Jun. 8, 2018 (KR) .......................... 10-2018-0066136

(51) Int. Cl.
*H04N 1/00* (2006.01)
*G03G 15/00* (2006.01)
*G03G 15/043* (2006.01)

(52) U.S. Cl.
CPC ....... *H04N 1/00029* (2013.01); *G03G 15/043* (2013.01); *G03G 15/50* (2013.01); *H04N 1/00037* (2013.01); *H04N 1/00045* (2013.01); *H04N 1/00074* (2013.01)

(58) Field of Classification Search
CPC .. G03G 15/043; G03G 15/50; G03G 15/5058; G03G 15/1675; G03G 15/1605;
(Continued)

(56) References Cited

U.S. PATENT DOCUMENTS 5,481,337 A * 1/1996 Tsuchiya ............ G03G 15/5037
                                                            347/130
5,517,227 A * 5/1996 Atsumi ............... G03G 15/0266
                                                            347/131
(Continued)

FOREIGN PATENT DOCUMENTS

JP      200139178    11/2001
JP      200227184     1/2002
(Continued)

*Primary Examiner* — Negussie Worku
(74) *Attorney, Agent, or Firm* — Staas & Halsey LLP

(57) ABSTRACT

An image forming apparatus includes an exposure device, a developing device, an intermediate transfer body, a sensor, and a controller. The exposure device may irradiate light corresponding to a test pattern onto a photoconductor, the developing device may supply a developing agent to the photoconductor to form, on the photoconductor, a toner image corresponding to the test pattern, the intermediate transfer body may receive the toner image corresponding to the test pattern formed on the photoconductor, and a sensor may sense the test pattern transferred onto the intermediate transfer body. The controller may control the exposure device to adjust the irradiated light so the test pattern becomes a contone pattern having a uniform tone, and may diagnose a condition of a component of the image forming apparatus based on the sensed test pattern.

15 Claims, 8 Drawing Sheets

(58) Field of Classification Search
CPC ........... G03G 15/1665; G03G 21/0005; G03G
2215/0129; G03G 15/0189; G03G
15/0266; G03G 15/065; G03G 15/0822;
G03G 15/163; G03G 15/5041; G03G
15/5062; G03G 21/20; G03G
2215/00042; H04N 1/00029; H04N
1/00037; H04N 1/00045; H04N 1/00074;
H04N 1/506; H04N 1/047; H04N 1/1135;
H04N 1/12; H04N 1/58; H04N
2201/03162; H04N 2201/04717; H04N
2201/04729; H04N 2201/04731; H04N
2201/04787; H04N 2201/04789; H04N
2201/04791; H04N 2201/0471; H04N
2201/04793; H04N 1/40087; H04N
1/4053; H04N 1/4092; H04N 1/482;
H04N 2201/02425; H04N 2201/04732;
G06T 5/006; G06T 2207/10008; G06T
2207/10024; G06T 2207/20012; G06T
2207/20192; G06T 2207/30176; G06T
5/002; G06T 5/003; G06T 5/20; G06T
7/12; B41J 2/471; B41J 2/525
USPC .......................................................... 358/1.1
See application file for complete search history.

(56) References Cited

U.S. PATENT DOCUMENTS

| | | | |
|---|---|---|---|
| 5,546,165 A | 8/1996 | Rushing et al. | |
| 6,628,903 B1* | 9/2003 | Ohori | G03G 15/70 399/21 |
| 6,934,448 B2* | 8/2005 | Akashi | G02B 6/4243 385/49 |
| 8,010,005 B2* | 8/2011 | Sukesako | G03G 15/0131 399/66 |
| 8,355,643 B2* | 1/2013 | Kojima | G03G 15/5041 399/49 |
| 2006/0050317 A1 | 3/2006 | Foster et al. | |
| 2006/0051138 A1* | 3/2006 | Sato | G03G 15/169 399/296 |
| 2008/0267640 A1* | 10/2008 | Hamaya | G03G 15/5041 399/26 |
| 2010/0067936 A1* | 3/2010 | Kitajima | G03G 15/5058 399/72 |
| 2010/0322648 A1* | 12/2010 | Kojima | G03G 15/5041 399/49 |
| 2011/0123235 A1* | 5/2011 | Matsuzaki | G03G 15/0131 399/301 |
| 2012/0294631 A1* | 11/2012 | Burry | G03G 15/5079 399/15 |
| 2014/0119755 A1* | 5/2014 | Shida | G03G 15/5058 399/49 |
| 2015/0055184 A1 | 2/2015 | Lin | |

FOREIGN PATENT DOCUMENTS

| | | |
|---|---|---|
| JP | 2004160706 | 6/2004 |
| JP | 2006133705 | 5/2006 |
| JP | 201579089 | 4/2015 |
| KR | 101265264 | 5/2013 |

* cited by examiner

| Attribute | Cause |
|---|---|
| Banding/Jitter | OPC, Magnetic Roller, CR Roller |
| Noise | OPC, ITB, EP (Charging) |
| Density | Developer, LSU, ITB, OPC |
| OPC Wearness | OPC |
| Auger Mark | Developer |

DIAGNOSING STATUS OF IMAGE FORMING APPARATUS

CROSS REFERENCE TO RELATED APPLICATIONS

This application is a U.S. National Stage Application which claims the benefit under 35 U.S.C. § 371 of International Patent Application No. PCT/KR2018/012892 filed on Oct. 29, 2018, which claims priority from Korean Patent Application No. 10-2018-0066136 filed on Jun. 8, 2018, the contents of each of which are incorporated herein by reference in their entireties.

BACKGROUND ART

In order to diagnose the print quality of an image forming apparatus, such as a printer, a copy machine, or a multifunction printer (MFP), the image forming apparatus enables a user to observe the print quality with the naked eyes by outputting a test pattern on a printing paper when the image forming apparatus is turned on or a user's command is received. At this time, technology called halftoning may be used.

DISCLOSURE

MODE FOR INVENTION

Figure 1:
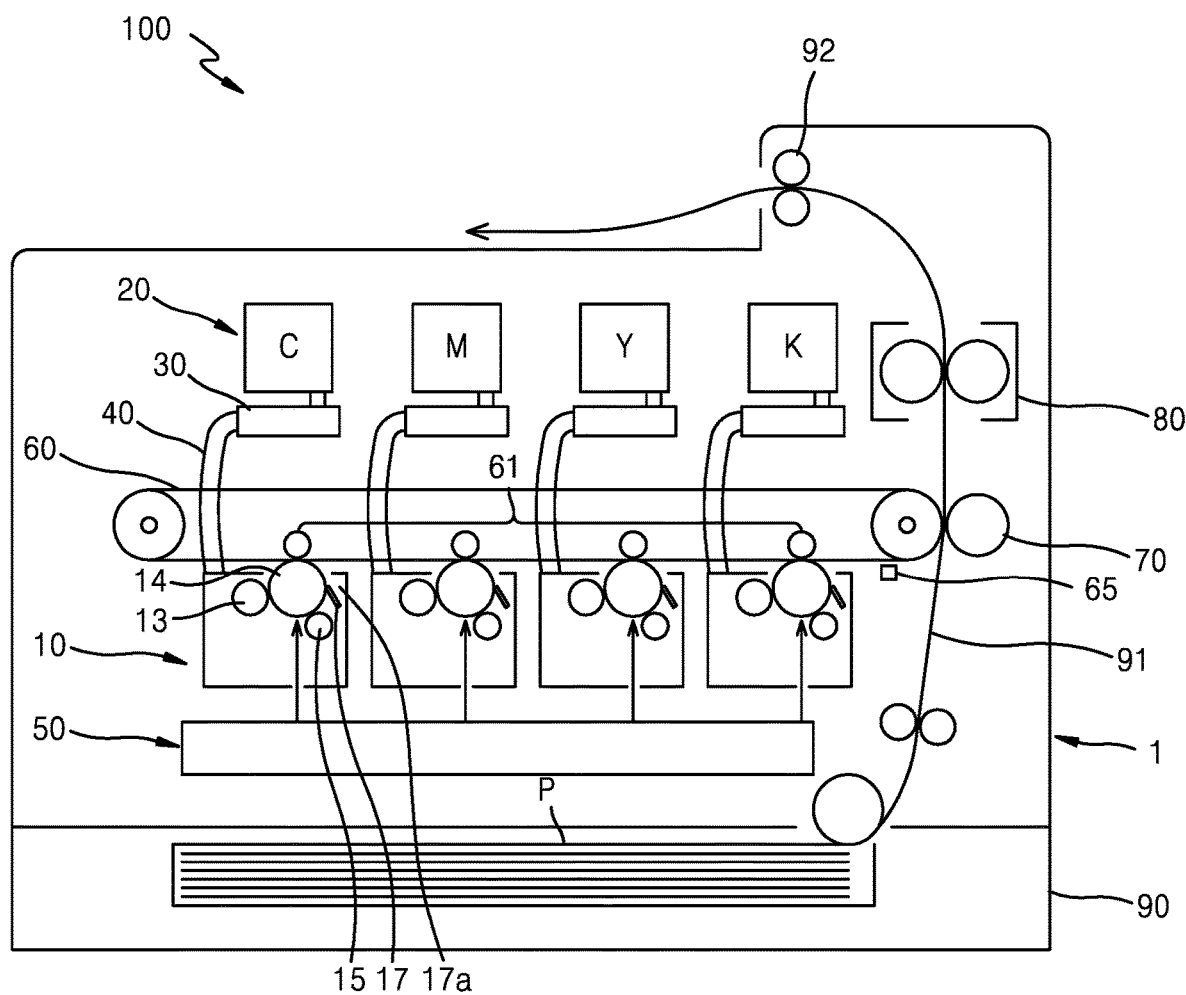
FIG. 1 is a diagram for describing a structure and operations of an image forming apparatus.

Hereinafter, examples are described in detail with reference to accompanying drawings. In addition, components having same functions are denoted by same reference numerals in the present specification and drawings, and redundant descriptions are omitted.

FIG. 1 is a diagram for describing a structure and operations of an image forming apparatus 100, according to an example. The image forming apparatus 100 according to the current example may print a color image via an electrophotographic development method. Referring to FIG. 1, the image forming apparatus 100 may include a plurality of developing devices 10, an exposure device 50, a transfer unit, and a fusing unit 80.

The image forming apparatus 100 may further include a plurality of developing agent cartridges 20 in which developing agents are accommodated. The plurality of developing agent cartridges 20 are respectively connected to the plurality of developing devices 10, and the developing agents accommodated in the plurality of developing agent cartridges 20 may be respectively supplied to the developing devices 10. The plurality of developing agent cartridges 20 and the plurality of developing devices 10 may be attached to or detached from a body 1, and may be individually replaced.

The plurality of developing devices 10 may form a toner image of cyan C, magenta M, yellow Y, and black K. The plurality of developing agent cartridges 20 may respectively accommodate the developing agents of cyan C, magenta M, yellow Y, and black K to be supplied to the plurality of developing devices 10. However, the present disclosure is not limited thereto, and the image forming apparatus 100 may further include the developing agent cartridges 20 and the developing devices 10 for accommodating and developing other colors of developing agents, such as light magenta and white, in addition to the above colors.

The developing device 10 may include a photoconductor 14 on which an electrostatic latent image is formed, and a developing roller 13 supplying the developing agent to the electrostatic latent image to develop a visible toner image. A photosensitive drum is an example of the photoconductor 14 on which an electrostatic latent image is formed, and may be an organic photoconductor (OPC) including a conductive metal pipe and a photosensitive layer around the conductive metal pipe, A charging roller 15 is an example of a charging device that charges the photoconductor 14 to have uniform surface potential. A charging brush, a corona charger, or the like may be employed instead of the charging roller 15.

The developing device 10 may further include a charging roller cleaner (not shown) removing impurities, such as a developing agent or dust, attached to the charging roller 15, a cleaning member 17 removing a developing agent remaining on a surface of the photoconductor 14 after an intermediate transfer process, and a regulating member (not shown) regulating an amount of a developing agent supplied to a developing region where the photoconductor 14 and the developing roller 13 face each other. A waste developing agent may be accommodated in a waste developing agent container 17a, The cleaning member 17 may be, for example, a cleaning blade scraping a developing agent by contacting a surface of the photoconductor 14.

The developing agent accommodated in the developing agent cartridge 20 may be supplied to the developing device 10. A developing agent supply unit 30 supplying the developing agent from the developing agent cartridge 20 to the developing device 10 may be connected to the developing device 10 by a supply pipe 40. The developing agent accommodated in the developing agent cartridge 20 may be toner, According to a developing method, the developing agent may be toner and a carrier. The developing roller 13 is spaced apart from the photoconductor 14. An interval between an outer circumference of the developing roller 13 and an outer circumference of the photoconductor 14 may be, for example, tens to hundreds of microns. The developing roller 13 may be a magnetic roller. Also, the developing roller 13 may have a structure in which a magnet is provided in a rotating developing sleeve. The toner and the carrier are mixed in the developing device 10, and the toner is adhered to a surface of a magnetic carrier. The magnetic carrier may be attached to the surface of the developing roller 13 and transferred to the developing region where the photoconductor 14 and the developing roller 13 face each other. The toner is supplied to the photoconductor 14 by a developing bias voltage applied between the developing roller 13 and the photoconductor 14, thereby developing the electrostatic latent image formed on the surface of the photoconductor 14 into a visible toner image.

The exposure device 50 forms the electrostatic latent image on the photoconductor 14 by irradiating light modulated according to image information onto the photoconductor 14, and a representative example of the exposure device 50 includes a laser scanning unit (LSU) using a laser diode as a light source, or a light-emitting diode (LED) exposure device using an LED as a light source.

The transfer unit may transfer the toner image formed on the photoconductor 14 to a recording medium P. In the current example, an intermediate transfer type transfer unit may be employed. According to an example, the transfer unit may include an intermediate transfer body 60, intermediate transfer rollers 61, and a transfer roller 70.

An intermediate transfer belt is an example of the intermediate transfer body 60 to which the toner image developed on the photoconductor 14 of the plurality of developing devices 10 is transferred, and may temporarily accommodate the toner image. The plurality of intermediate transfer rollers 61 may be arranged at locations facing the photoconductors 14 of the plurality of developing devices 10, wherein the intermediate transfer body 60 is provided between the photoconductors 14 and the intermediate transfer rollers 61. An intermediate transfer bias voltage for intermediately transferring the toner image developed on the photoconductor 14 to the intermediate transfer body 60 may be applied to the plurality of intermediate transfer rollers 61. A coroner transfer unit or a pin scorotron type transfer unit may be employed instead of the intermediate transfer rollers 61.

The transfer roller 70 may face the intermediate transfer body 60. A transfer bias voltage for transferring the toner image transferred to the intermediate transfer body 60 to the recording medium P may be applied to the transfer roller 70.

The fusing unit 80 may fuse the toner image transferred to the recording medium P on the recording medium P by applying heat and/or pressure. A structure of the fusing unit 80 is not limited to that shown in FIG. 1.

According to the above structure, the exposure device 50 may form the electrostatic latent image on the photoconductor 14 by irradiating lights modulated according to image information of each color to the photoconductors 14 of the plurality of developing devices 10. The electrostatic latent image of the photoconductors 14 of the plurality of developing devices 10 may be developed into the visible toner image by the developing agents of cyan C, magenta M, yellow Y, and black K supplied from the plurality of developing agent cartridges 20 to the plurality of developing devices 10. Developed toner images may be sequentially and intermediately transferred to the intermediate transfer body 60. The recording medium P loaded in a paper-feeding tray 90 may be transferred along a paper-feeding path 91 and between the transfer roller 70 and the intermediate transfer body 60. The toner image intermediately transferred to the intermediate transfer body 60 may be transferred by a transfer bias voltage applied to the transfer roller 70. When the recording medium P passes through the fusing unit 80, the toner image is fused onto the recording medium P by heat and pressure. After the fusing, the recording medium P may be discharged by discharge rollers 92.

Figure 2:
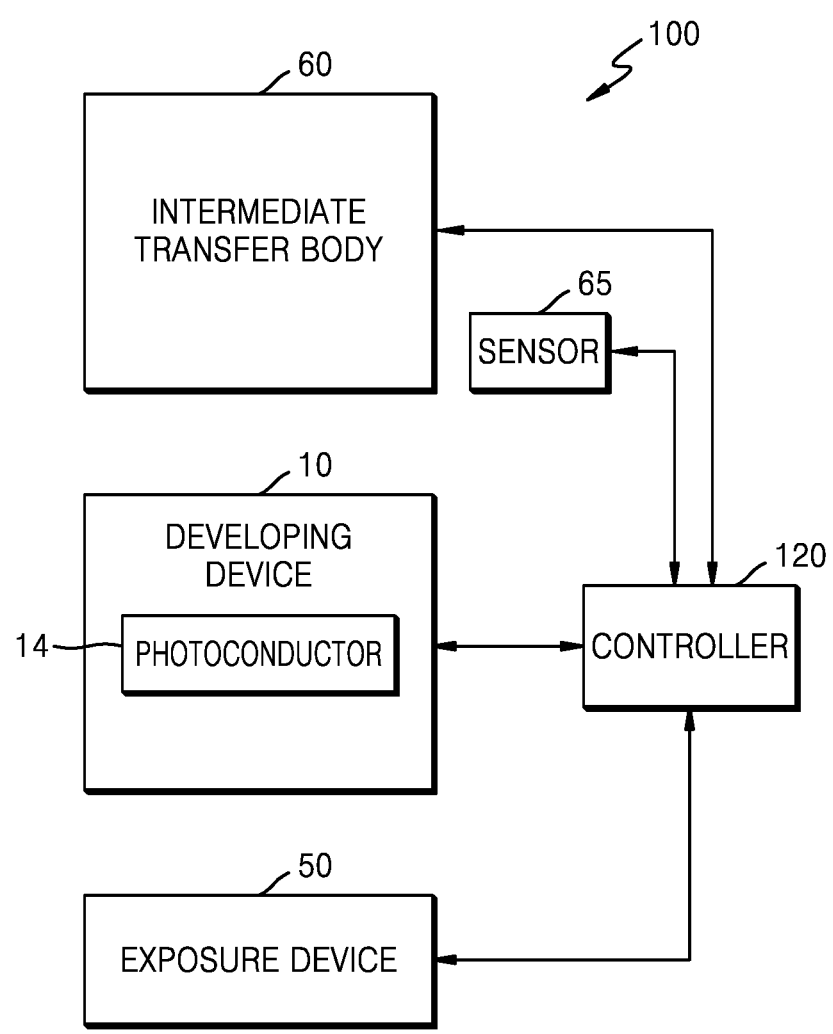
FIG. 2 is a block diagram of a configuration of an image forming apparatus.

FIG. 2 is a block diagram of a configuration of the image forming apparatus 100.

Referring to FIG. 2, the image forming apparatus 100 according to an example may include the exposure device 50, the developing device 10, the intermediate transfer body 60, a sensor 65, and a controller 120.

The exposure device 50 may irradiate, on the photoconductor 14, light corresponding to a test pattern for diagnosing a condition of the image forming apparatus 100. The test pattern is a type of a test image formed by the image forming apparatus 100 to diagnose the condition of the image forming apparatus 100, and may be used to detect various types of printing quality defects that may be generated in the image forming apparatus 100. The exposure device 50 may irradiate, on the photoconductor 14, light modulated based on a signal transmitted from the controller 120. The exposure device 50 may determine whether to irradiate light based on an on/off signal, and may also irradiate light having intermediate intensity according to the signal transmitted from the controller 120. For example, the exposure device 50 may vary the intensity of irradiated light according to a value within a range from 0x00 that does not form an electrostatic latent image to 0xFF that forms an electrostatic latent image for a high density print image.

The developing device 10 may form, on the photoconductor 14, a toner image corresponding to the test pattern by supplying the developing agent to the photoconductor 14.

The intermediate transfer body 60 may receive the toner image corresponding to the test pattern formed on the photoconductor 14.

The sensor 65 may sense the test pattern transferred to the intermediate transfer body 60. The sensor 65 may be a photo-sensor. When the test pattern includes a plurality of patterns, there may be a plurality of the sensors 65 to correspond to the patterns. The sensor 65 may face one side of the intermediate transfer body 60 to correspond to the same line of a main scanning direction of the intermediate transfer body 60. When there are sensors 65, the sensors 65 may sense the test pattern at a location corresponding to the same line of the main scanning direction of the intermediate transfer body 60.

The controller 120 controls overall operations of the image forming apparatus 100, and may include at least one processor, such as a central processing unit (CPU). The controller 120 may control other components included in the image forming apparatus 100.

The controller 120 may control the exposure device 50 such that the test pattern becomes a contone pattern having a uniform tone. In this regard, the controller 120 may include a processor adjusting the intensity of light irradiated from the exposure device 50 such that the test pattern becomes a contone pattern, and a pulse width modulator (PWM) transmitting a signal according to the light having the adjusted intensity to the exposure device 50.

The controller 120 may diagnose the condition of the image forming apparatus 100, based on the sensed test pattern. For example, the controller 120 may diagnose a condition of at least one of the photoconductor 14, the intermediate transfer body 60, and the developing device 10, based on a defect detected from quality of the sensed test pattern. Also, the controller 120 may predict a condition change of the image forming apparatus 100, based on the condition of the image forming apparatus 100, which is periodically diagnosed. For example, the controller 120 may determine an inspection period of the image forming apparatus 100 by predicting a quality change based on the quality of the test pattern, which is periodically sensed, and predicting a time when the image forming apparatus 100 abnormally operates. Also, the controller 120 may predict a life expectancy of a component, based on a condition of the component, which is periodically diagnosed.

Meanwhile, the image forming apparatus 100 may be connected to an external apparatus through a communication interface (not shown). The image forming apparatus 100 may include a module supporting at least one of various wired/wireless communication methods, for connection or communication with the external apparatus. The controller 120 may control the communication interface to transmit the condition of the image forming apparatus 100, which is periodically diagnosed, to a printing service management server.

Also, the image forming apparatus 100 may display information about an image forming job or information about the condition of the image forming apparatus 100, or receive a user input from a user, through a user interface device (not shown). The user interface device may be in a form of a touch screen. The controller 120 may control the user interface device to display, to the user, a diagnosis result of diagnosing the image forming apparatus 100, and to display diagnosis details and a corrective measure in response to a user input with respect to the diagnosis result.

Figure 3:
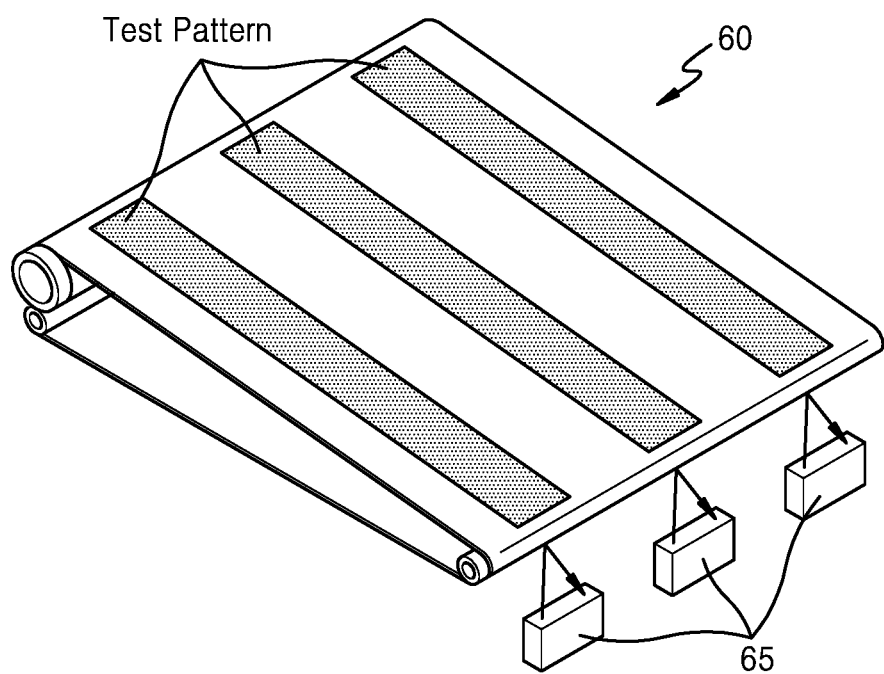
FIG. 3 is a diagram for describing processes in which a test pattern is transferred to an intermediate transfer body of an image forming apparatus and a sensor senses the test pattern.

FIG. 3 is a diagram for describing processes in which a test pattern is transferred to the intermediate transfer body 60 of the image forming apparatus 100 and the sensor 65 senses the test pattern.

Referring to FIG. 3, the test pattern is transferred (intermediately transferred) onto the intermediate transfer body 60. Here, the test pattern may be a contone pattern having a uniform tone. The contone pattern may mean that the entire test pattern has certain brightness of same density.

Figure 4A:
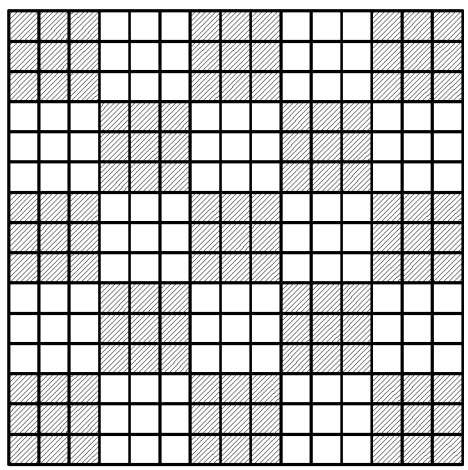
FIGS. 4A and 4B are diagrams for describing a test pattern.
Figure 4B:
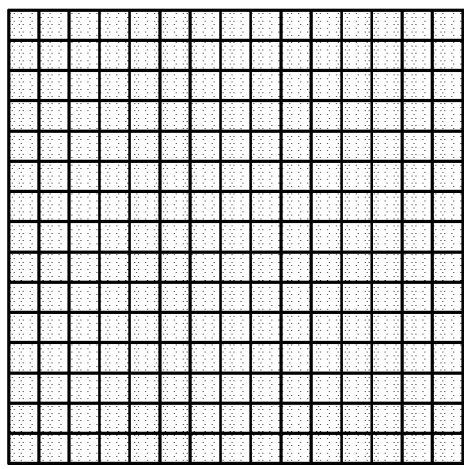

FIGS. 4A and 4B are diagrams for describing a test pattern.

FIG. 4A illustrates a test pattern configured in a halftoning pattern, and FIG. 4B illustrates a test pattern configured in a contone pattern, FIGS. 4A and 4B are examples of test patterns for realizing the image quality of intermediate density. In the test pattern using a halftoning pattern of FIG. 4A, a quality defect is barely shown on the test pattern, and thus, it may be difficult to diagnose the condition of the image forming apparatus 100. However, when the contone pattern of FIG. 4B is used, a quality defect is shown well on the test pattern, and thus, the condition of the image forming apparatus 100 may be easily diagnosed. In order to sense the test pattern and the quality defect by using the sensor 65 provided inside the image forming apparatus 100, the test pattern using the contone pattern of FIG. 4B may be used.

Referring back to FIG. 3, the test pattern includes a center test pattern located at the center of the main scanning direction of the intermediate transfer body 60, and left and right test patterns respectively located at left and right sides of the center test pattern at equal intervals. FIG. 3 illustrates an example in which the test pattern is formed at a center portion of the intermediate transfer body 60 and at two edge portions based on the center portion of the intermediate transfer body 60, but the example is not limited thereto.

When the intermediate transfer body 60 moves, the test pattern transferred onto the intermediate transfer body 60 may be sensed by the sensor 65 facing one side of the intermediate transfer body 60 to correspond to the same line of the main scanning direction of the intermediate transfer body 60. As shown in FIG. 3, there may be a plurality of sensors 65 to respectively correspond to a plurality of patterns forming the test pattern. The sensor 65 may sense the test pattern on the intermediate transfer body 60 rotated by the intermediate transfer rollers 61.

Figure 5:
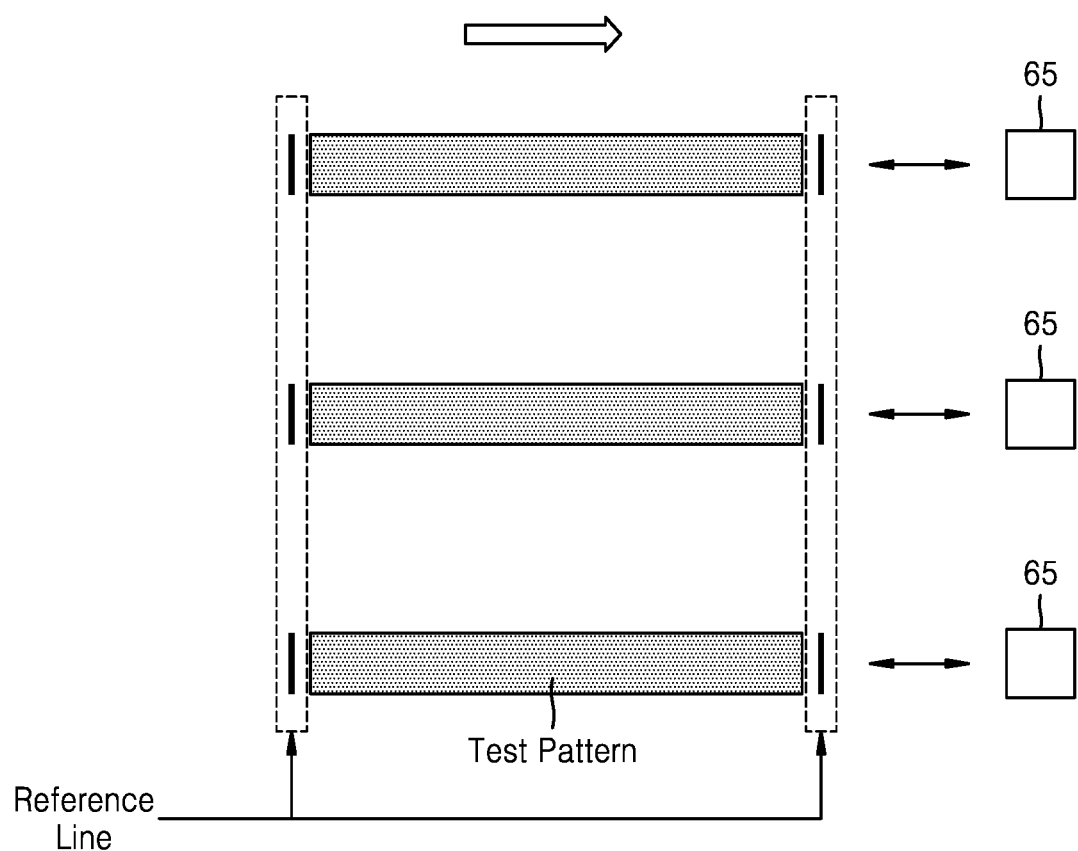
FIG. 5 is a diagram for describing a method of sensing and checking a test pattern.

FIG. 5 is a diagram for describing a method of sensing and checking a test pattern.

As shown in FIG. 5, the test pattern may be sensed by the sensor 65 when the test pattern moves to a location detectable by the sensor 65. Here, there may be a reference line before a starting portion and after an ending portion of the test pattern. In other words, the test pattern may be located between two reference lines, and a length of the test pattern in a sub-scanning direction of the intermediate transfer body 60 may be longer than a length corresponding to two rotation cycles of the photoconductor 14.

According to an example of sensing and checking a test pattern, a reference line located at a starting portion of the test pattern and a reference line located at an ending portion of the test pattern are detected from a signal sensed by the sensor 65, and the test pattern located between the two reference lines is checked.

Figure 6:
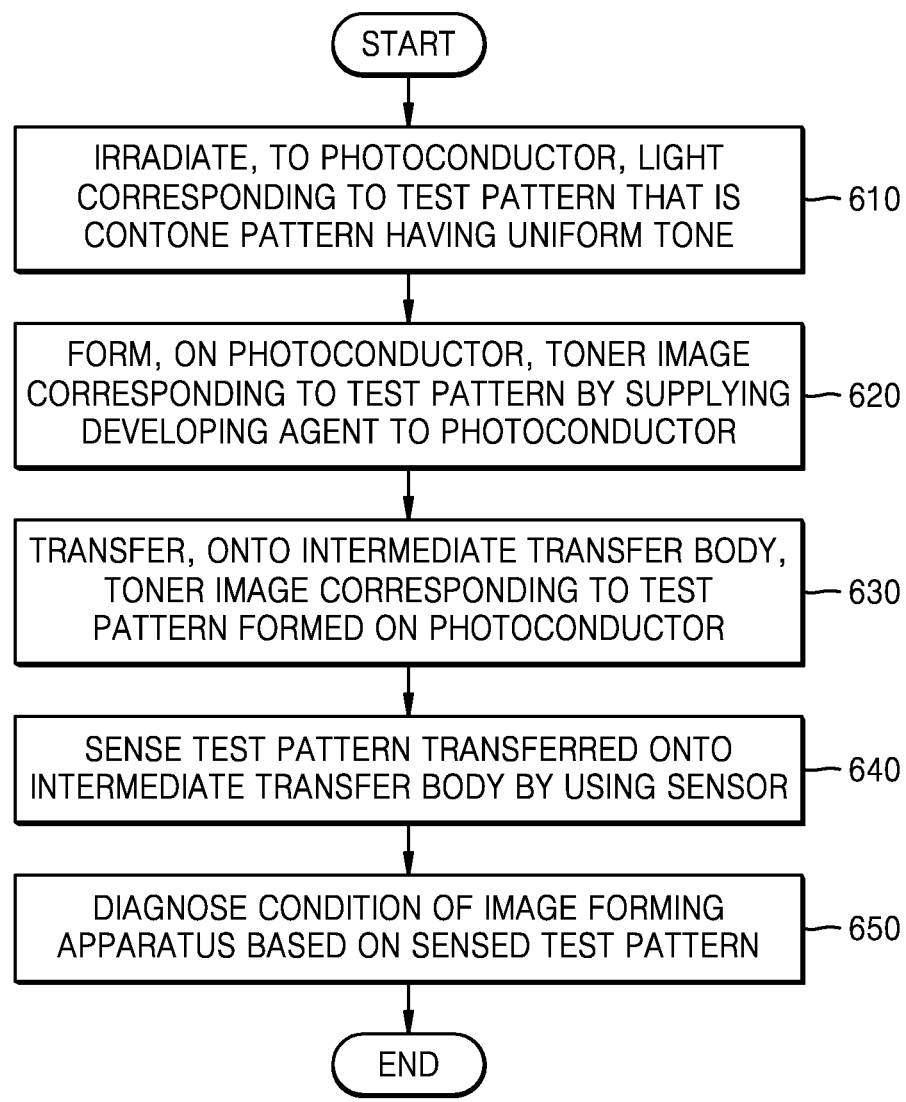
FIG. 6 is a flowchart of a method of diagnosing a condition of an image forming apparatus.

FIG. 6 is a flowchart of a method of diagnosing a condition of the image forming apparatus 100.

In operation 610, the image forming apparatus 100 may irradiate, to the photoconductor 14, light corresponding to a test pattern that is a contone pattern having a uniform tone. The image forming apparatus 100 may adjust the intensity of the light such that the test pattern becomes the contone pattern, and generate a signal according to the adjusted intensity of the light through a PWM. The image forming apparatus 100 may irradiate, to the photoconductor 14, the light corresponding to the test pattern according to the generated signal.

In operation 620, the image forming apparatus 100 may form, on the photoconductor 14, a toner image corresponding to the test pattern by supplying a developing agent to the photoconductor 14.

In operation 630, the image forming apparatus 100 may transfer, on to the intermediate transfer body 60, a toner image corresponding to the test pattern formed on the photoconductor 14.

In operation 640, the image forming apparatus 100 may sense the test pattern transferred onto the intermediate transfer body 60 by using the sensor 65.

In operation 650, the image forming apparatus 100 may diagnose a condition of the image forming apparatus 100, based on the sensed test pattern. For example, the image forming apparatus 100 may obtain a frequency signal via a Fourier transform with respect to the sensed test pattern, set a certain threshold value for each spatial frequency, and determine a cycle component of a space frequency exceeding the threshold value. As another example, the image forming apparatus 100 may analyze the test pattern via an average value or a standard deviation of the sensed test pattern, or comparison between average values of a plurality of test patterns. Accordingly, the image forming apparatus 100 may diagnose a condition of at least one of the photoconductor 14, the intermediate transfer body 60, and the developing device 10, based on a defect detected from the quality of the sensed test pattern. The image forming apparatus 100 may prepare a mapping table, in which a phenomenon detected from the test pattern and a component related to the detected phenomenon are matched, so as to diagnose the condition of the component based on the defect detected from the quality of the sensed test pattern.

Figures 7, 8:
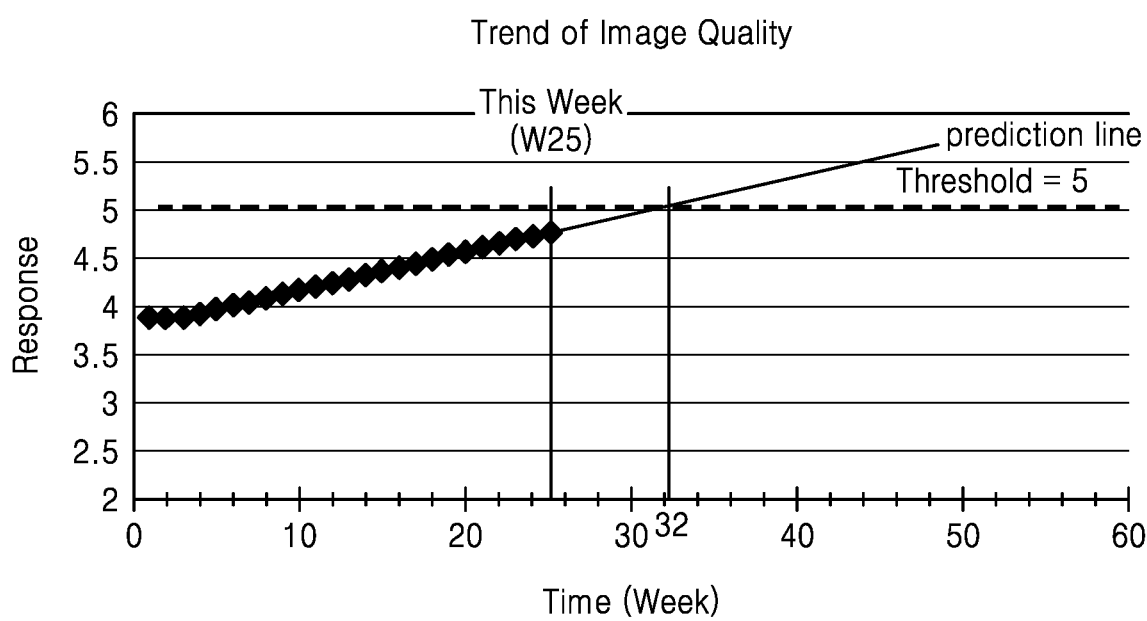
FIG. 7 illustrates an example of a mapping table, in which a phenomenon detected in a test pattern and a component related to the detected phenomenon are matched.
FIG. 8 is a graph for describing an example of predicting a condition change of an image forming apparatus, based on a condition of the image forming apparatus, which is periodically diagnosed.

FIG. 7 illustrates an example of a mapping table, in which a phenomenon detected in a test pattern and a component related to the detected phenomenon are matched.

Referring to FIG. 7, there are various types of detects, for example, a banding/jitter phenomenon may be detected from the quality of the test pattern, noise may be detected, the quality may be abnormal, there may be deviation in the quality of left-center-right test patterns, and an auger mark may be detected, and components that may be causes of the defects are matched to the defects. For example, since a phenomenon where there is deviation in the quality of the left-center-right test patterns is generated due to uneven wear at one portion of the photoconductor 14, the deviation may be matched to the photoconductor 14.

Meanwhile, the image forming apparatus 100 may predict a condition change of the image forming apparatus 100 based on the condition of the image forming apparatus 100, which is periodically diagnosed, or transmit the condition of the image forming apparatus 100, which is periodically diagnosed, to a printing service management server.

FIG. 8 is a graph for describing an example of predicting a condition change of the image forming apparatus 100, based on a condition of the image forming apparatus 100, which is periodically diagnosed.

Referring to FIG. 8, the image forming apparatus 100 may predict a quality change based on image quality of a test pattern that is periodically sensed, set a certain threshold value for determining abnormality of the image quality, and predict a time when the image forming apparatus 100 may abnormally operate.

Figure 9:
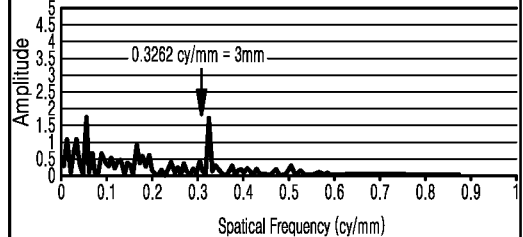
FIGS. 9 and 10 illustrate examples of user interfaces displaying a diagnosis result of diagnosing a condition of an image forming apparatus and displaying a diagnosis detail and a corrective measure according to a user's request.
Figure 10:
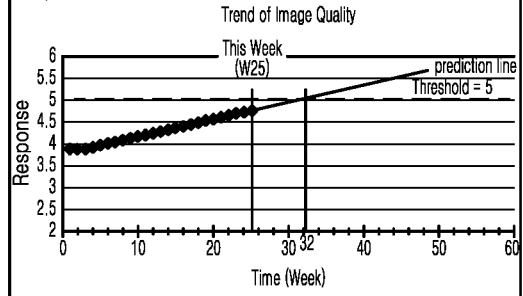

FIGS. 9 and 10 illustrate examples of user interfaces displaying a diagnosis result of diagnosing a condition of the image forming apparatus 100 and displaying a diagnosis detail and a corrective measure according to a user's request.

The image forming apparatus 100 may display, to a user, the diagnosis result of diagnosing the condition of the image forming apparatus 100. The image forming apparatus 100 may display the diagnosis details and the corrective measure in response to a user's input with respect to the diagnosis result.

For example, referring to FIG. 9, a user interface indicating that a banding phenomenon is detected from the image quality of a test pattern of the image forming apparatus 100 is provided to the image forming apparatus 100, and when the user wants to view a detailed diagnosis result, a user interface providing a diagnosis detail indicating that lines of 3 mm cycles are shown in an image and a corrective measure indicating that the photoconductor 14 needs to be replaced may be provided to the image forming apparatus 100. As another example, referring to FIG. 10, a user interface indicating that a noise phenomenon is detected from the image quality of a test pattern of the image forming apparatus 100 is provided to the image forming apparatus 100, and when the user wants to view a detailed diagnosis result, a user interface providing a diagnosis detail indicating that undesired noise is increased in an image and a corrective measure indicating that the photoconductor 14 needs to be replaced may be provided to the image forming apparatus 100.

Meanwhile, the method of diagnosing the condition of the image forming apparatus 100 described above may be embodied as computer-executable instructions and data on a computer-readable recording medium. At least one of the instructions and data may be stored in a form of program code, and when executed by a processor, may generate a certain program module to perform a certain operation. Examples of the computer-readable recording medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMS, BD-ROMs, BD-Rs, BD-R LTHs, BD-REs, magnetic tape, a floppy disk, a magneto-optical data storage device, an optical data storage device, a hard disk, a solid-state disk (SSD), and any device capable of storing instructions or machine readable instructions, related data, a data file, and data structures and providing the instructions or machine readable instructions, the related data, the data file, and the data structures to a processor or a computer such that the processor or the computer may execute the instructions.

While examples have been described with reference to the figures, it will be understood by those of ordinary skill in the art that various changes in form and details may be made therein without departing from the spirit and scope as defined by the following claims.

The invention claimed is:

1. An image forming apparatus comprising:
   an exposure device to irradiate light corresponding to a test pattern onto a photoconductor;
   a developing device to supply a developing agent to the photoconductor to form, on the photoconductor, a toner image corresponding to the test pattern;
   an intermediate transfer body to receive the toner image corresponding to the test pattern formed on the photoconductor;
   a sensor to sense the test pattern transferred onto the intermediate transfer body; and
   a controller to control the exposure device to adjust the irradiated light so the test pattern becomes a contone pattern having a uniform tone, and to diagnose a condition of the image forming apparatus based on the sensed test pattern.

2. The image forming apparatus of claim 1, wherein the controller includes:
   a processor to adjust an intensity of the light irradiated from the exposure device so the test pattern becomes the contone pattern; and
   a pulse width modulator (PWM) to transmit, to the exposure device, a signal according to the adjusted intensity.

3. The image forming apparatus of claim 1, wherein a length of the test pattern in a sub-scanning direction of the intermediate transfer body is longer than a length corresponding to two rotation cycles of the photoconductor.

4. The image forming apparatus of claim 1, wherein the test pattern includes a center test pattern located at a center of a main scanning direction of the intermediate transfer body, a left test pattern located at a left side of the center test pattern, and a right test pattern located at a right side of the center test pattern.

5. The image forming apparatus of claim 4, wherein the left test pattern and the right test pattern are located at equal intervals from the center test pattern.

6. The image forming apparatus of claim 1, wherein the controller is to diagnose a condition of at least one of the photoconductor, the intermediate transfer body, and the developing device, based on a defect detected from quality of the sensed test pattern.

7. The image forming apparatus of claim 1, further including a communication interface,
   wherein the controller is to predict a condition change of the image forming apparatus based on a condition of the image forming apparatus, which is periodically diagnosed, or control the communication interface to transmit the condition of the image forming apparatus, which is periodically diagnosed, to a printing service management server.

8. The image forming apparatus of claim 1, further including a user interface device,
    wherein the controller is to control the user interface device to display, to a user, a diagnosis result of diagnosing a condition of the image forming apparatus, and display a diagnosis detail and a corrective measure in response to a user input with respect to the diagnosis result.

9. A method of diagnosing a condition of an image forming apparatus, the method comprising:
    irradiating, on a photoconductor, light corresponding to a test pattern, the test pattern being a contone pattern having a uniform tone;
    forming, on the photoconductor, a toner image corresponding to the test pattern by supplying a developing agent to the photoconductor;
    irradiating, onto an intermediate transfer body, the toner image corresponding to the test pattern formed on the photoconductor;
    sensing the test pattern transferred onto the intermediate transfer body, by using a sensor; and
    diagnosing a condition of the image forming apparatus based on the sensed test pattern.

10. The method of claim 9, wherein the irradiating of the light on the photoconductor includes:
    adjusting an intensity of the light so the test pattern becomes the contone pattern;
    generating a signal according to the adjusted intensity through a pulse width modulator (PWM); and
    irradiating, on the photoconductor, the light corresponding to the test pattern according to the generated signal.

11. The method of claim 9, wherein a length of the test pattern in a sub-scanning direction of the intermediate transfer body is longer than a length corresponding to two rotation cycles of the photoconductor.

12. The method of claim 9, wherein the test pattern includes a center test pattern located at a center of a main scanning direction of the intermediate transfer body, a left test pattern located at a left side of the center test pattern, and a right test pattern located at a right side of the center test pattern.

13. The method of claim 9, wherein the diagnosing of the condition of the image forming apparatus includes diagnosing a condition of at least one of the photoconductor, the intermediate transfer body, and a developing device, based on a defect detected from quality of the sensed test pattern.

14. The method of claim 9, further including predicting a condition change of the image forming apparatus, based on a condition of the image forming apparatus, which is periodically diagnosed, or transmitting the condition of the image forming apparatus, which is periodically diagnosed, to a printing service management server.

15. The method of claim 9, further including:
    displaying, to a user, a diagnosis result of diagnosing a condition of the image forming apparatus; and
    displaying a diagnosis detail and a corrective measure in response to a user input with respect to the diagnosis result.

* * * * *